United States Patent [19]

Roberts

[11] Patent Number: 4,802,327
[45] Date of Patent: Feb. 7, 1989

[54] MOWER ATTACHMENT

[76] Inventor: Charles A. Roberts, Star Route, Box 24, Vian, Okla. 74962

[21] Appl. No.: 903,697

[22] Filed: Sep. 4, 1986

[51] Int. Cl.$^4$ .................... A01D 34/86; B26D 1/46
[52] U.S. Cl. ........................ 56/15.2; 56/255; 56/295; 56/17.4; 56/10.4; 83/676; 83/831
[58] Field of Search ............ 56/16.4, 15.2, 17.4, 56/235, 255, 295, 320.1; 144/335, 336, 231, 232, 235, 251 R, 34 R; 30/381, 382, 390, 391, 384; 83/838, 831, 676, 814

[56] References Cited

U.S. PATENT DOCUMENTS

| | | | |
|---|---|---|---|
| 1,349,557 | 8/1920 | Boswell | 30/384 |
| 2,958,348 | 11/1960 | Bueneman | 83/838 |
| 3,263,715 | 8/1966 | Dobbertin | 30/384 |
| 3,343,575 | 9/1967 | Trout | 144/34 R |
| 3,528,464 | 9/1970 | Kennemore | 83/831 |
| 3,805,639 | 4/1974 | Peter | 30/391 |
| 4,104,851 | 8/1978 | Perry | 56/10.4 |
| 4,563,929 | 1/1986 | Ringlee | 144/34 R |
| 4,627,322 | 12/1986 | Hayhurst | 83/838 |

FOREIGN PATENT DOCUMENTS

| | | | |
|---|---|---|---|
| 235667 | 9/1964 | Austria | 83/831 |
| 1018976 | 2/1966 | United Kingdom | 83/838 |

*Primary Examiner*—John Weiss
*Attorney, Agent, or Firm*—Head & Johnson

[57] ABSTRACT

A mower attachment for use on farm and highway equipment such as tractors. A cutting head assembly is mounted on an extensible boom supported from the tractor. The cutting head assembly can be moved in three dimensions without changing the position of the tractor. The cutting head assembly has a guard for the cutting chain and has a window therein. A door can open and close the window. It is especially useful for cutting brush along fence rows. It can be useful for cutting and trimming trees.

10 Claims, 6 Drawing Sheets

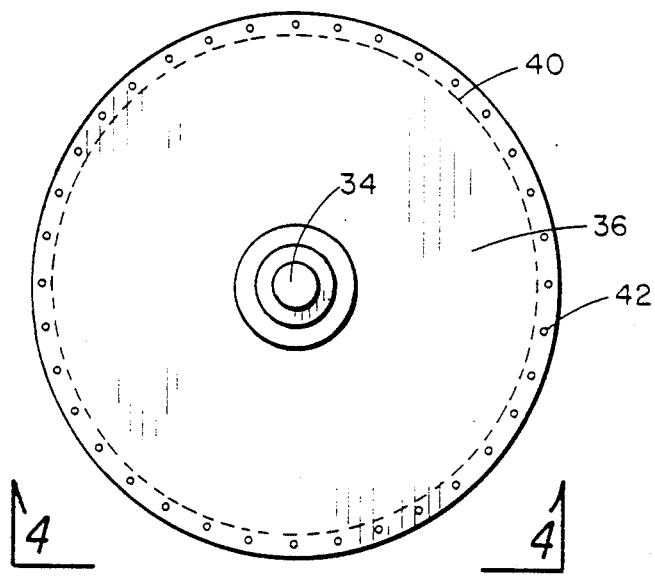
Fig. 3
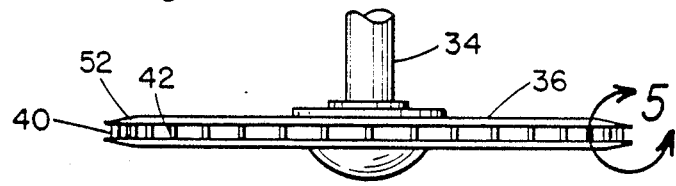
Fig. 4
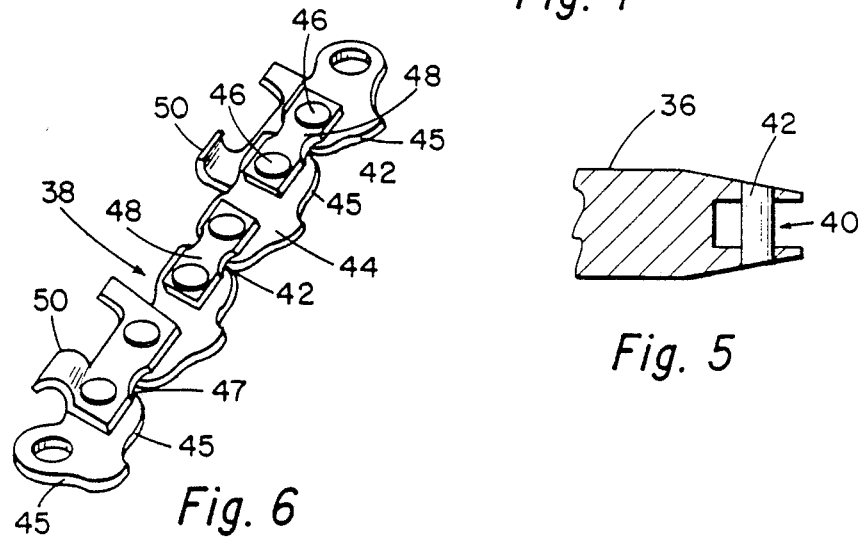
Fig. 6
Fig. 5

MOWER ATTACHMENT

BACKGROUND OF THE INVENTION

1. Field of the Invention

This invention relates to a mowing machine and generally more specifically to a large mowing apparatus adapted to cut underbrush, small trees and the like, along highways and under fence rows and also may be used to trim trees.

2. Background of the Invention

Various cutting machines have been used to cut underbrush, small trees, saplings, bushes, shrubs, weeds and so forth. Some of these mowing machines are attached to trucks, others are attached to tractors. One such apparatus is shown in U.S. Pat. No. 4,509,315, to Giguere entitled "Bush Wood Mowing Apparatus." It has a floating work head mounted at the working end of an articulated hydraulic arm. U.S. Pat. No. 2,815,058 to Davis shows another mobile brush cutting machine and shows a telescoping boom for supporting the cutting head. It shows a tubular column telescopically slidably mounted in tubular arm 18 and telescoped by hydraulic ram cylinder 26. U.S. Pat. No. 2,958,348 to Bueneman shows a circular saw in which a saw chain is secured to the saw blade for rotation as a unit by inserting through depending anchor portions 36 so raker lengths small connector pins 38. The patentee states that these pins not only function to unite the two parts for simultaneous movement but also act to hold the chain radially inwardly on the saw blade. Despite all of the work that has been done in developing brush cutting devices there still remains problems to be solved. One of these is the cutting of such brush along a fence row. The various brush cutting devices such as referred to above can cut under the barbed wire but runs into difficulty when approaching a post.

OBJECTS

In view of the above, it is an object of the present invention to provide a cutting apparatus for use on a tractor which satisfactorily solves the problem of cutting brush around fence posts. It is still a further object of this invention to provide a cutting apparatus which has a novel way of mounting a chain to a circular disc and it is a still further object of this invention to provide a housing covering a major portion of the cutting disc and having a window for exposing part of the chain saw and to provide a door operable to close at least a portion of the windows upon actuation.

SUMMARY OF THE INVENTION

This invention has a cutting head assembly mounted on the end of an extensible boom which is mounted on a vehicle such as a tractor. The cutting head can be moved in three dimensions. The cutting head assembly includes a disc with a groove along its in circumference and a saw chain fitting in this groove. The chain has cutting teeth on its outer edge and V-notches on its inner edge. Pins extend through the top and the bottom of the groove and through the notch to prevent excessive slippage between the chain and the disc. This keeps the saw chain tight when in use. The disc is bevelled such that at its outer circumferences it is of smaller thickness than the inner part of the disc. This aids in preventing sticking when cutting larger tree trunks.

A housing is provided that covers a large part of the top of the disc and has lips extending downwardly over the teeth of the chain saw but for less than the entire length of the chain thus forming a window where the chain is exposed for a selected arcuate angle. A door is operable to close a part or all of the window upon actuation. In operation when the cutting head assembly is cutting under a fence and approaches a post, the door mechanism is actuated to at least partially close. The extensible boom which holds the cutting head is spring loaded to be in position essentially pependicular to the travel of the tractor upon which it is actuated. When the post is approached, the door is closed so that the door will contact the fence post instead of the saw which would otherwise severely damage or cut the fence post in two. The arm swings backwardly with respect to the movement of the tractor so that the cutting head will clear the post. As soon as the post is cleared, the spring pulls the cutting head back to its normal position so that upon opening the door it continues to cut the grass underneath the fence.

A better understanding of the invention can be had with the following description, taken in conjunction with the drawings.

BRIEF DESCRIPTION OF THE DRAWINGS

FIG. 3 illustrates the top view of the cutting disc.

FIG. 4 is a view taken along the line 4—4 of FIG. 3.

FIG. 5 is a view of the lock pin in the disc of FIG. 4.

FIG. 6 illustrates a portion of the chain saw for mounting in the groove of the disc of FIGS. 3 and 4.

FIG. 8A illustrates a mechanism permitting the cutting head shown in FIG. 8 to be rotated about the axis of the extensible boom.

DETAILED DESCRIPTION OF THE PREFERRED EMBODIMENTS

Figure 1:
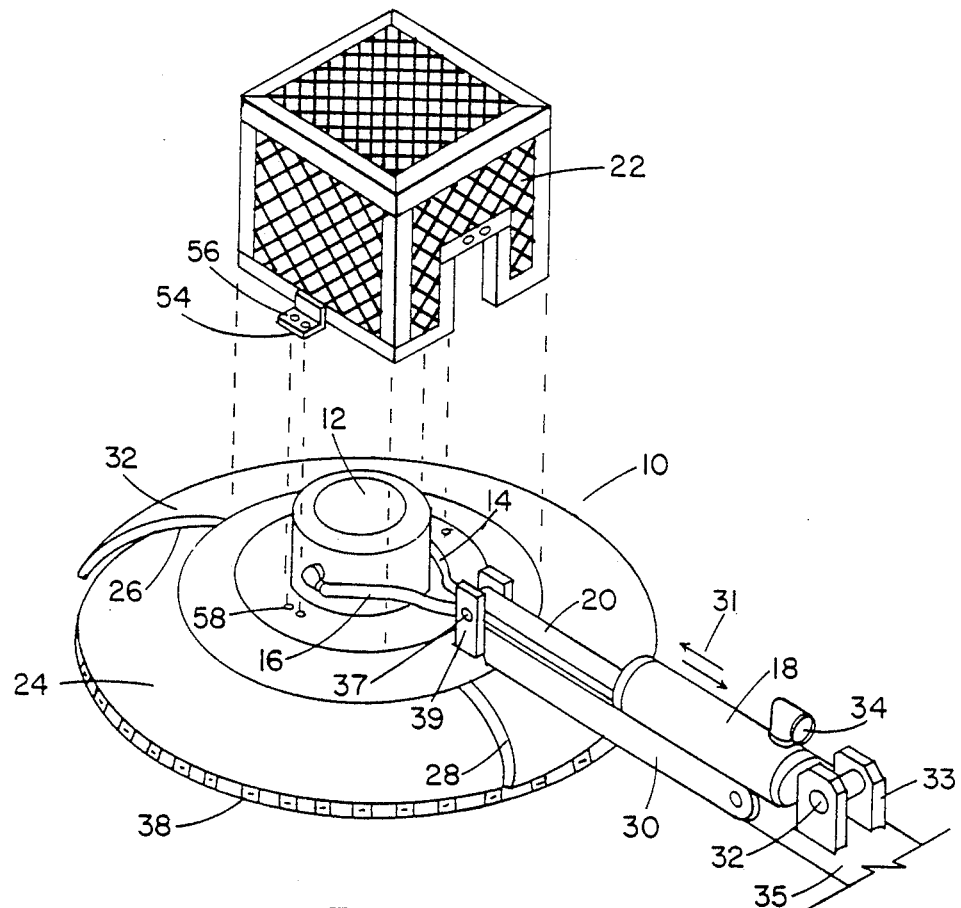
FIG. 1 illustrates the cutting head assembly.

Attention is first directed to FIG. 1 which shows the general arrangement of my cutting head assembly 10. Shown thereon is a motor 12 having an inlet hydraulic line 14 and an outlet hydraulic line 16 for driving the motor 12. A housing 32 supports the motor 12 and is provided with a window 24 between edge 26 and edge 28. A door for closing window 24 will be described in conjunction with FIG. 9. As shown in FIG. 4, the motor 12 is connected to drive shaft 34 which supports disc 36. Discor wheel 36 may be any diameter and is typically 30" wide to about 60 inches in diameter. The drive shaft 34 is securely fastened to the disc 36 so as to support it and any rotation of shaft 34 will rotate disc 36. A cutting chain 38 which may be similar to a chain saw chain, is provided in peripheral groove 40 of disc 36. The groove 40 has a plurality of locking pins 42 mounted about the periphery thereof.

Attention is next directed to FIG. 6 which shows the chain which is mounted in groove 40 of disc 36. This includes a plurality of chain element lengths 44 which are connected together by fastening pins 46 and bars 48. These pins 46 also secure cutting teeth segments 50. The chain element links 44 are each provided with a double tapered surface 45 and when connected as shown in FIG. 6 shows forms notches 47 therebetween. It is in this notch 47 that locking pins 42 are placed as indicated by the dotted lock pins 42.

As shown in FIG. 4 disc 36 is provided with a taper 52. This helps prevent the cutting disc 36 from being wedged or stuck in the cut groove when used to cut down a fairly large tree.

The chain shown in FIG. 6 is mounted about the groove 40 of disc 36 by placing the pins 42 in notches 47. In operation when using the device to cut trees, etc. the disc 36 is rotated. This rotates the cutting chain. As the chain teeth bite into the wood, pins 42 are drawn against the sloping sides of the V-notch. This force pushes the chain outwardly thus causing tension. With the arrangement I get substantial tension on the chain and thus increase its effectiveness.

Figure 2:
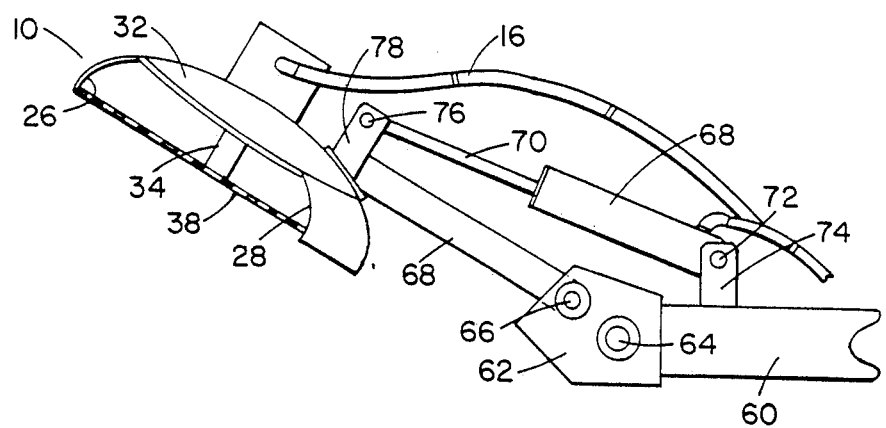
FIG. 2 illustrates the cutting head assembly attached to a back hoe arm.

Attention is now directed back to FIGS. 1 and 2. Shown in FIG. 1 is a cage 22 having tabs 54 with holes 56 which matches with holes 58 in housing 32. The cage and housing are held together by bolts or rivets or other means not shown. This cage protects the motor. Shown in FIG. 1 is a powered arm 30 which can extend or retract cutting head 10 in the direction of the arrows 31. This powered arm 30 includes a hydraulic cylinder 18 and extension rod 20. The hydraulic cylinder 18 is supplied with a hydraulic fluid to connection 34 and another connection not shown which can be connected in the usual manner. The one end of the housing of the hydraulic cylinder 18 is connected to the pin hinge 32 which is in a bracket 33 fixed to member 35 which may be connected to a tractor. Extension rod 30 is connected to a pin 37 in support 39 which is fixed to housing 32. Telescoping booms are well known so it is not considered that any further description of this telescoping boom is essential.

Attention is now directed to FIG. 2 which shows cutting head 10 supported from what can be called a back hoe arm 60. A plate 62 is connected securely by horizontal pin 64 to back hoe arm 60. A hinge pin 66 connects an arm 68 to the housing 32 of the cutting head 10. A hydraulic cylinder 68 with extension rod 70 is provided. The hydraulic cylinder 68 is connected by hinge pin 72 to support 74 which is secured to the back hoe arm 60. The outer end of extension rod 70 is connected by horizontal pin 76 to support 78 which is supported from housing 2. By extending or retracting extension rod 70 by applying power to the proper end of hydraulic cylinder 68 the cutting head 10 can be raised or lowered by pivoting arm 68 about pivot pin 66. The position of the cutting head as shown in FIG. 2 would be especially suitable for cutting on an embankment when the tractor is on a level surface.

Figure 7:
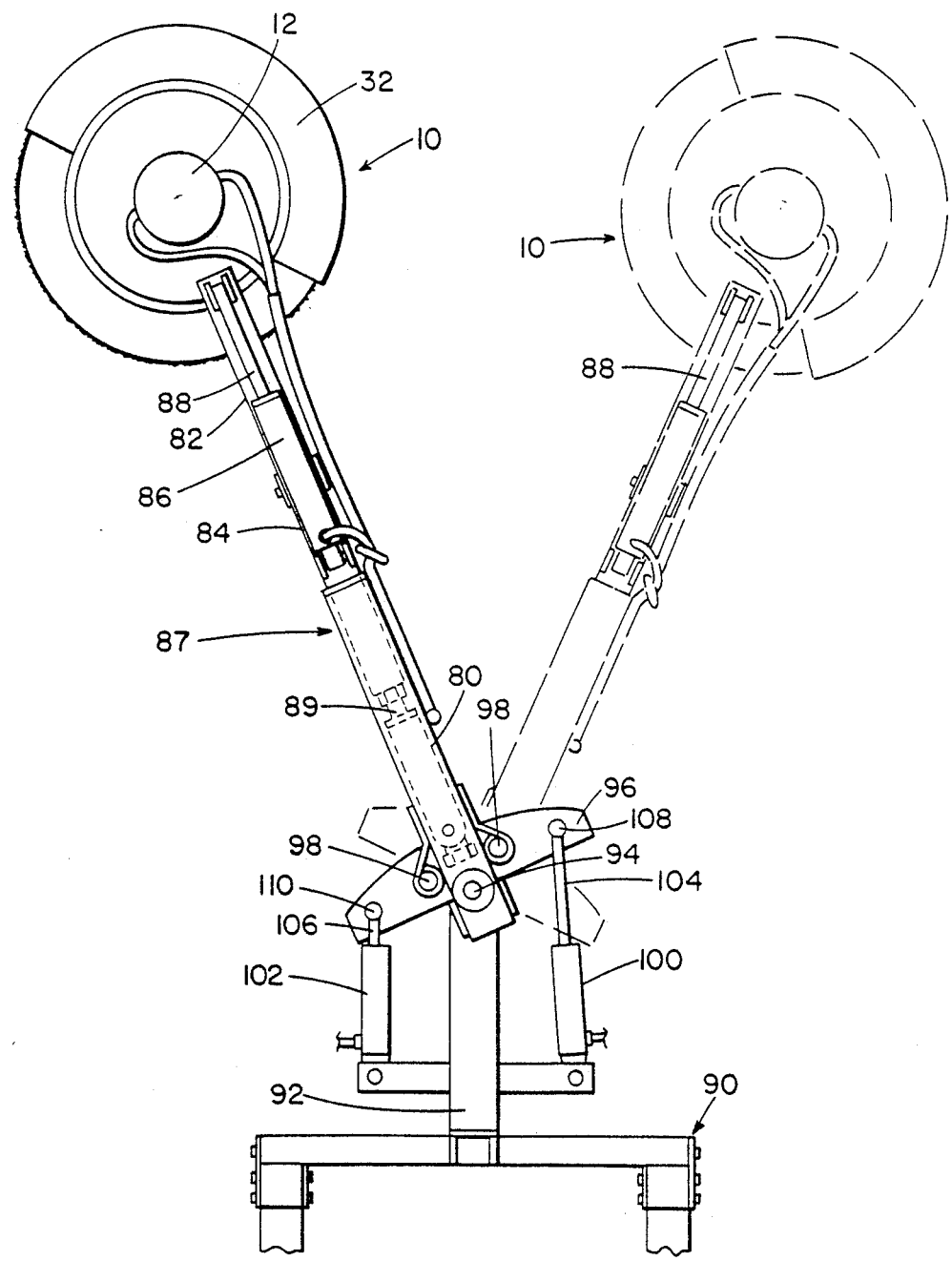
FIG. 7 illustrates a cutting head mounted on an extensible boom rotatable to various positions and mounted on a front lift hookup.
Figure 8:
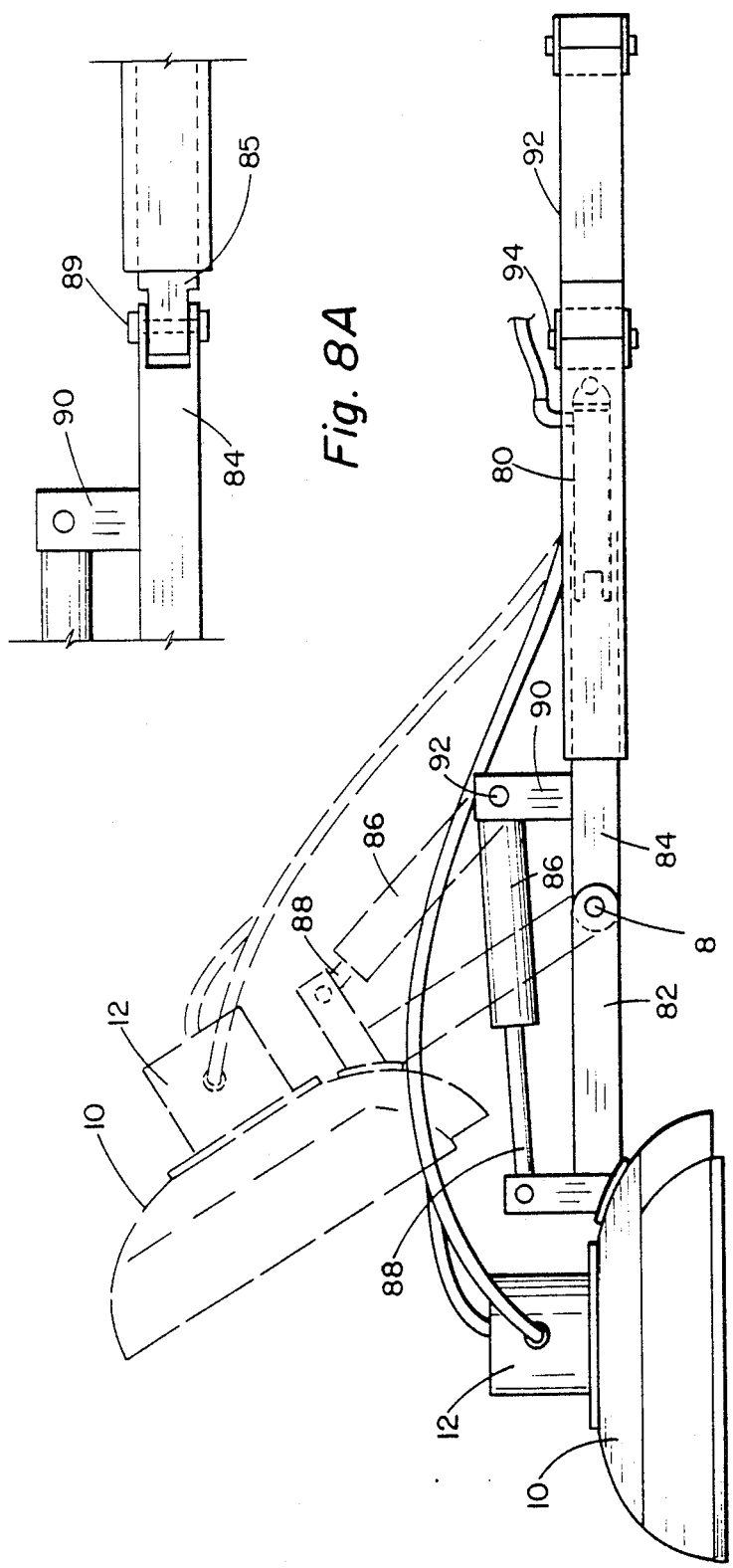
FIG. 8 is a side view of the cutting head assembly mechanism of FIG. 7 and shows the cutting head raisable to a position for cutting on an incline.

Attention is next directed to FIGS. 7 and 8 which show one embodiment of my invention which is useful in connecting to a tractor having a front lift hookup system. This shows a mechanism whereby the cutting head 10 can be moved either up or down or from side to side. It includes an extensable boom 87 powered by hydraulic cylinder 80 for moving arm 84. Extension end 82 is connected to extension arm 84 by pivot pin 83. The position of extension arm 84 is determined by the position of the extension rod 89 of hydraulic cylinder 80. The angular position of extension end 82 is determined by the position of extension rod 88 of hydraulic cylinder 86 which is connected to support 90 by pivot 92. By retracting extension rod 88 the cutting head assumes the position of the dashed line in FIG. 8. Hydraulic motor 12, power cylinder 86 and 80 are preferably hydraulic type and are powered by hydraulic lines from a power source, both in a well known manner. Other type motors and rams can be used. The manner of operating extension end 82 and arm 84 from cylinder 80 is known so that a further detailed explanation of it is not considered necessary. The extension boom 87 is supported from a front lift hookup 90. This connection includes a tongue 92 having a pin hinge 94 which connects with the extension boom 87. The extension boom 87 is connected to yoke 96 by stabilizing pins 98. The position of the yoke with respect to the tongue 92 just depends upon the position of hydraulic cylinders 100 and 102 which respectively has extension rods 104 and 106. The ends of these extension rods are connected to yoke 96 by pivot pins 108 and 110, respectively. By retracting extension arm 104 and extending rod 106 the boom and cutting head will take the position shown by the dashed lines. Thus, the system shown in FIG. 7 shows how the device can rotate horizontally when mounted on a tractor and in FIG. 8 the apparatus shows how the cutting head 10 can be raised and lowered to various tilted positions. The cutting head 8 can be made to rotate with respect to the extension boom 87. One manner of doing this is the manual method and as shown in FIG. 8A extension arm 84 is connected to extension neck 85 by a pin 89. By providing a plurality of holes in extension arm 84 and neck 85 for pin 87 the cutting head can be rotated to various selected positions.

Figure 9:
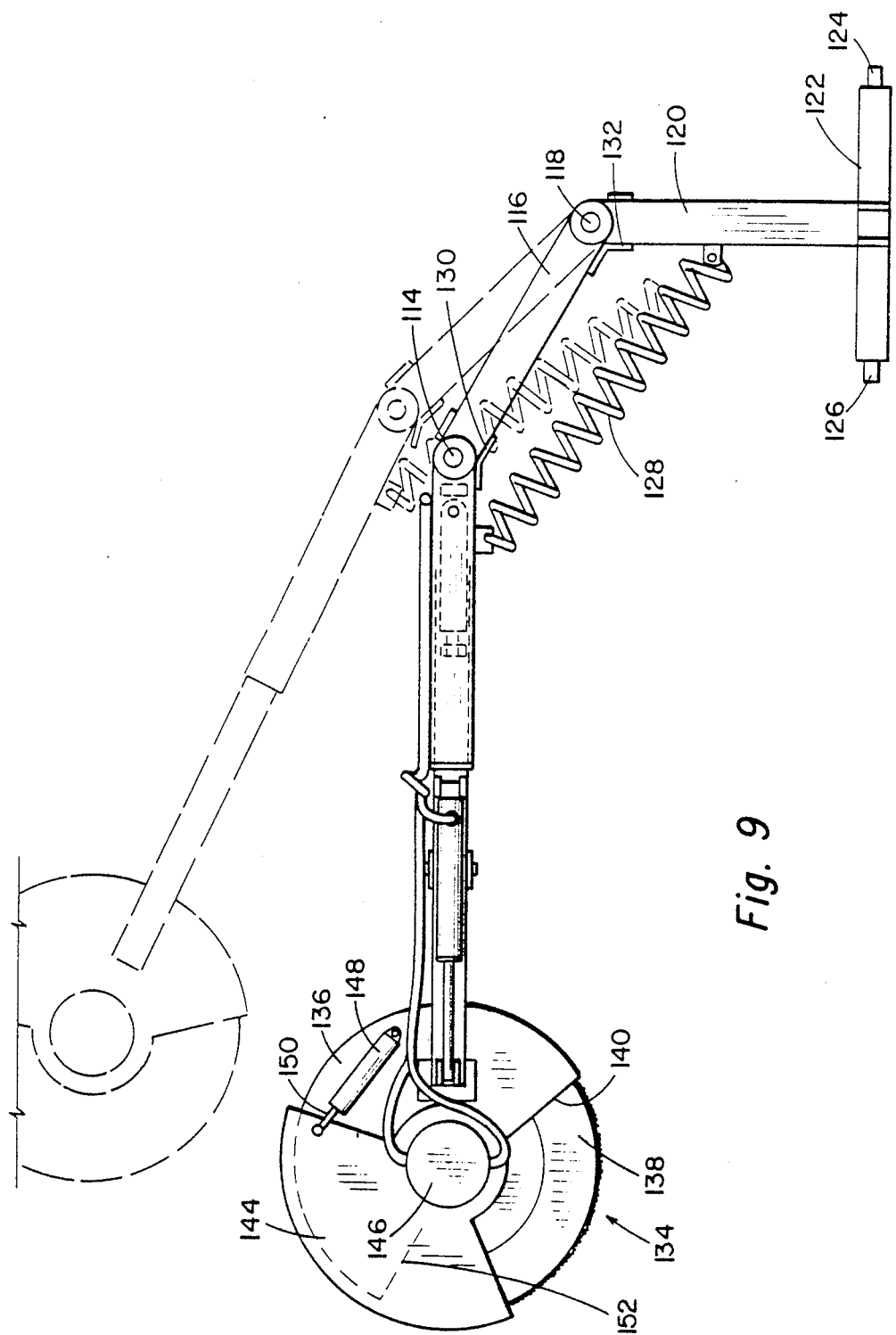
FIG. 9 illustrates a cutting head assembly with window and door mounted on an extensible boom and is biased to a set position and is useful for cutting along fence posts.

Attention is next directed to FIG. 9 which shows an embodiment which is especially adapted for cutting brush and so forth along fence rows. A closable door for the window is also illustrated. Although shown in regard to FIG. 9, this closable door can be used on the other embodiments of my invention. Shown thereon is an extension boom 112. Extension boom 112 can be quite similar to extension boom 87 of FIG. 7. The boom 112 is connected by vertical pin hinge 114 to a swinging arm 116 which is connected by the vertical pin hinge 118 to tongue 120. Tongue 120 is connected to an accessory 122 having connecting pins 124 and 126 which may be used to connect to a tractor. A spring 128 holds the extension boom 112 in the position shown in solid lines. These angle stops 130 and 132 prevent the spring 128 from rotating extension boom 112 any further about vertical pins 114 and 118. The cutting head 134 mounted on the extensible boom 112 is provided with a housing 136 having window 138 which extends between the edge 140 and 142. A door 144 is pivotally attached about motor 146 to slide or rotate with respect to the housing 136. A hydraulic cylinder 148 with extension rod 150 is used to rotate the housing to where it can cover any part or all of the window 138. In a preferred embodiment the teeth of the chain are exposed below the door when the door is closed. This permits some cutting on small flexible brush even with the door closed. But with the door closed any encounter with a substantially firm object such as a fence post would not be cut by the chain. This is because the door extends radially out farther from the motor 146 than do the teeth of the chain 152. When the door is closed and the tractor is moving, if the door encounters a firm object such as a fence post, the cutting head and extension boom and swinging arm will be moved to a position such as shown by the dashed line.

Figure 10:
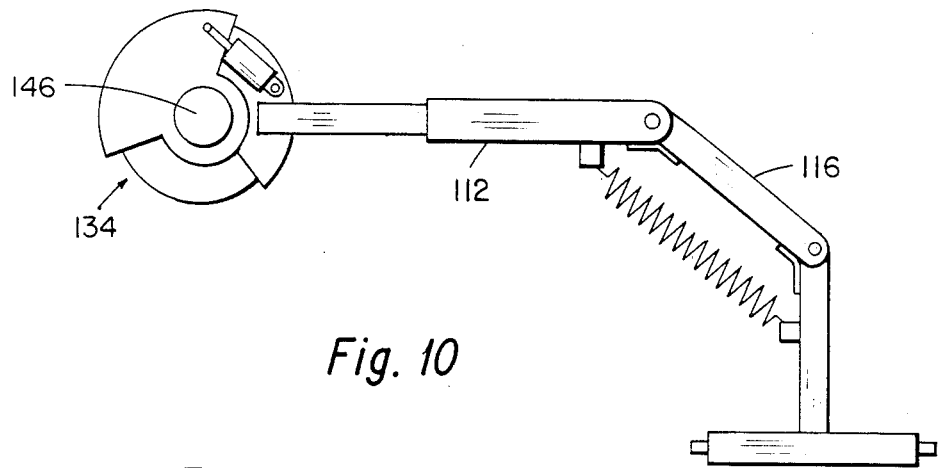
FIG. 10 is a schematic view of the apparatus of FIG. 9.
Figure 11:
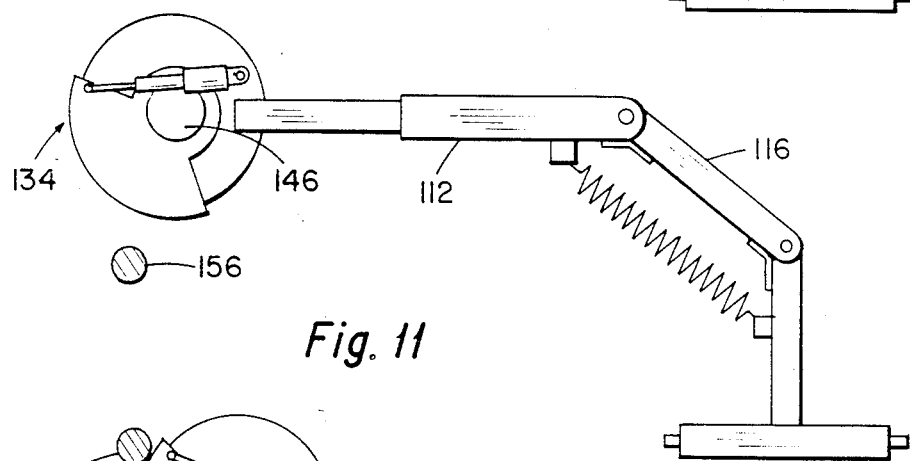
FIG. 11 shows the apparatus of FIG. 10 approaching a post and with the door closed.
Figure 12:
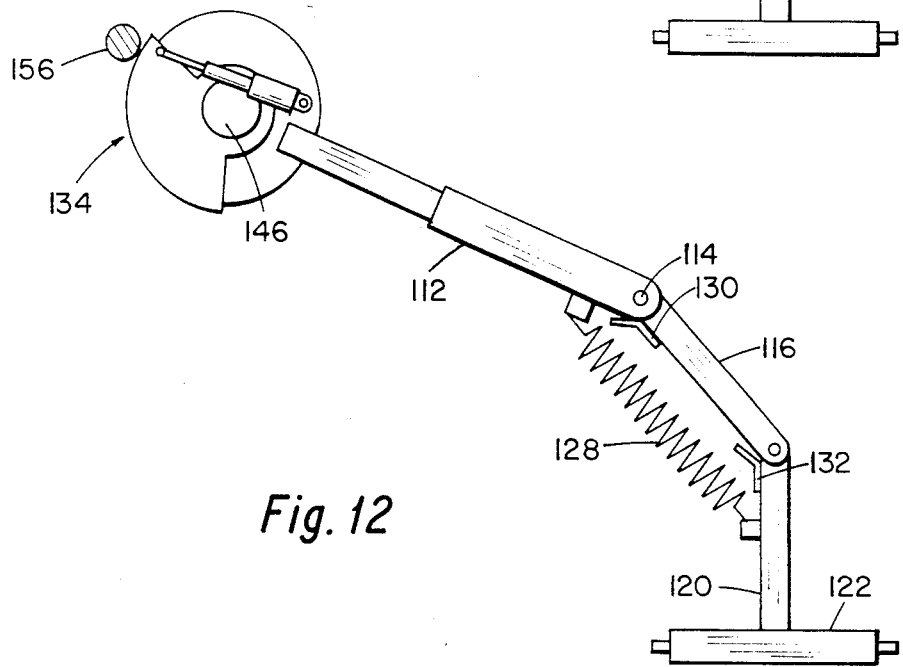
FIG. 12 shows a device of FIG. 11 rotating about the post.

Attention will next be directed to FIGS. 10, 11 and 12 to illustrate progressively the operation of the cutting device of FIG. 9 when a fence post is encountered. As stated above, this device is especially useful for cutting brush and so forth under a fence row. As shown in FIG. 10 the cutting head is extended under a fence row and the door is wide open, with the window 138 open and cutting in full progress. The door stays in this position until a fence post 156 comes in the path of the window 138 as illustrated in FIG. 11. As the cutting head approaches the post 156 the operator will actuate the door closing cylinder 148 and cause it to be closed so that the door will contact post 156 and prevent the cutting chain from contacting and cutting the post 156. Spring 128 returns the boom 112 and swings arm 116 to the position shown in FIG. 11. As the tractor moves as shown in FIG. 12 when the closed door 144 contacts the post 156 the extension boom 112 and the swing arm 16 will swing around as indicated in FIG. 12 until the door 144 clears the post 156. As soon as the post 156 is cleared, the operator will open the door 144 and resume normal operations.

By using the proper lifting components my device can also be used for trimming trees.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplifcation, but is to be limited only by the scope of the attached claim or claims, including the full range of equivalency to which each element thereof is entitled.

What is claimed is:

1. A cutting apparatus which comprises:
   a disc with a groove in its circumference;
   a chain having cutting teeth on its outer edge and V-notches in its inner edge and positioned in said groove;
   pins extending through said groove and said notches, but not through the material of said chain, to prevent excessvie slippage between said chain and said disc to provide for transfer of rotational force between said disc and the V-notch of said chain.

2. A cutting apparatus as defined in claim 1 in which said disc is bevelled such that its outer circumference is of a smaller thickness than the inner part of said disc.

3. A cutting apparatus as defined in claim 1 including an axle supporting said disc and means to rotate said axle;
   first motor means to drive said disc;
   a housing covering at least one side of said disc and having lips extending downwardly over the teeth of said chain for less than the entire length of the chain forming a window where the chain is exposed for a selected arcuate angle;
   a door operable to close at least a part of said window;
   second motor means to operate said door independent of the operation said first motor.

4. The cutting apparatus as defined in claim 3 in which said door is planar and is such that it extends radially out farther than the teeth of said chain but with the teeth of said chain exposed below said door.

5. A cutting apparatus as defined in claim 4 including connecting means to attach said cutting apparatus to a tractor.

6. A cutting apparatus as defined in claim 5 in which said connecting means includes:
   an extension boom connected to the said housing;
   a swinging arm;
   a first pivot pin connecting said extension boom with said swinging arm;
   a second pivot pin connecting said swinging arm to an attachment for a tractor;
   biasing means connected between said extension boom and said attachment;
   first means to limit the rotation of said extension boom about said first pin;
   second limiting means limiting the rotation of said swinging arm about said second pivot pin.

7. A cutting apparatus as defined in claim 6 including means to tilt said disc with respect to said extension boom.

8. A cutting apparatus as defined in claim 7 including means to position said disc in a selected rotatable position with respect to said extension boom.

9. A cutting apparatus which comprises:
   a cutting head including a rotatable chain saw;
   first motor means to drive said chain saw;
   a housing covering said head and having lips extending over at least a portion of said rotatable chain saw;
   said housing having a window therein exposing a portion of said chain saw for cutting;
   a door supported by said housing;
   second motor means operable to move said door from an open to a position closing said window independent of any operation of said first motor means.

10. A cutting apparatus for use with a tractor having a tool receiving attachment which comprises:
    a disc with a cutting chain;
    a housing covering at least one part of said disc and having an opening forming a window where the cutting chain is exposed for a selected arcuate angle;
    a door operable to close at least a part of said window;
    an extensible boom connected to said housing;
    a swinging arm;
    a first pin connecting said extensible boom with said swinging arm;
    a second pivot pin connecting said swinging arm to an attachment for a tractor;
    biasing means connected between said extensible boom and said attachment;
    first means to limit the rotation of said extensible boom about said first pin;
    second limiting means limiting the rotation of said swinging arm about said second pivot pin.

* * * * *